(12) United States Patent
Berger et al.

(10) Patent No.: US 7,877,996 B2
(45) Date of Patent: **\*Feb. 1, 2011**

(54) TURBO-LAG COMPENSATION SYSTEM HAVING AN EJECTOR

(75) Inventors: Al Berger, Brownstown, MI (US); Thomas Leone, Ypsilanti, MI (US)

(73) Assignee: Ford Global Technologies, LLC, Dearborn, MI (US)

( \* ) Notice: Subject to any disclaimer, the term of this patent is extended or adjusted under 35 U.S.C. 154(b) by 1464 days.

This patent is subject to a terminal disclaimer.

(21) Appl. No.: 11/288,725

(22) Filed: Nov. 28, 2005

(65) Prior Publication Data

US 2007/0119169 A1   May 31, 2007

(51) Int. Cl.
*F02B 33/44* (2006.01)

(52) U.S. Cl. .............................. 60/598; 60/599; 60/601; 60/611

(58) Field of Classification Search ............ 60/598–612
See application file for complete search history.

(56) References Cited

U.S. PATENT DOCUMENTS

| | | | |
|---|---|---|---|
| 2,698,613 A | 1/1955 | Jagersberger | |
| 3,695,820 A | 10/1972 | Hawkes et al. | |
| 4,235,209 A * | 11/1980 | Ibbott | 123/585 |
| 4,413,646 A * | 11/1983 | Platt et al. | 137/240 |
| 4,715,184 A * | 12/1987 | Oosawa et al. | 60/602 |
| 5,680,839 A | 10/1997 | Moore | 123/184.58 |
| 6,148,616 A * | 11/2000 | Yoshida et al. | 60/605.2 |
| 6,826,910 B1 * | 12/2004 | Easton | 60/597 |
| 7,076,952 B1 * | 7/2006 | Vetrovec | 60/605.1 |
| 7,314,043 B1 * | 1/2008 | Berger et al. | 123/585 |
| 2004/0187840 A1 * | 9/2004 | Nakayama et al. | 123/302 |

FOREIGN PATENT DOCUMENTS

JP   59-99028   7/1984
JP   63-9632   1/1988

OTHER PUBLICATIONS

Percival, et al., "Performance with Economy—The RamAire System", SAE Article No. 670109, Jan. 9-13, 1967.

\* cited by examiner

*Primary Examiner*—Hoang M Nguyen
(74) *Attorney, Agent, or Firm*—Julia Voutyras; Alleman Hall McCoy Russell & Tuttle LLP (57) ABSTRACT

A boost system for an engine is described. In one example, the boost system provides air to an engine cylinder via a converging-diverging valve seat. The system can reduce turbocharger lag during some conditions.

22 Claims, 11 Drawing Sheets

TURBO-LAG COMPENSATION SYSTEM HAVING AN EJECTOR

BACKGROUND AND SUMMARY

Engines may use boosting devices, such as turbochargers, to increase engine power density. Thus, under steady state operation, smaller displacement turbocharged engines can produce power equivalent to larger displacement engines. However, under dynamic driving conditions, the smaller turbocharged engine may have less transient performance than a larger, naturally aspirated engine.

As one example, when a turbocharged engine is operating at low load, the turbocharger speed is low and intake manifold pressure is low. When the engine load is suddenly increased, there may be a lag before the turbocharger speed increases and intake manifold pressure rises. This delay may be referred to as "turbo-lag." During this delay, the engine power or torque output may be less than the desired value, and less than the steady state available output.

One approach that attempted to provide intake manifold pressure boost with minimal delay is described in SAE paper 670109, published in 1967. This system used storage tanks to store compressed air with a carbureted, otherwise naturally aspirated gasoline engine. In this system, when the system was actuated, desired boost pressures were achieved rapidly.

Another approach is described in JP 59-99028. This system uses a compressed-air injecting port receiving air from a compressed-air tank, where the port was formed in a valve seat of the intake valve, and said port is opened when the intake valve is opened. An on-off valve is opened transiently for a prescribed period when an accelerator pedal is rapidly depressed. When the intake valve is open, air is injected through the valve seat for supplementing lack of air caused transiently when the accelerator pedal is depressed. Specifically, when the accelerator pedal depression signal exceeds a prescribed valve, the on-off valve is opened by a computer for a prescribed period corresponding to the pedal depressing speed. With such a system, boost compensation is allegedly unnecessary.

However, the inventors herein have recognized disadvantages with each of the above approaches. For example, if using the storage approach of SAE 670109, boost was provided for only a limited time since storage tanks were the only source of compressed air. Further, the system required two tanks of about 12 inches in diameter each, thus requiring significant packaging space in the vehicle.

When using a system such as JP 59-99028, while compressed air may be added to the engine, it does not appear that the energy of compression of the added air is used to amplify air flow through the main intake port. This means that the compressed air tank must be large enough to supply all of the desired increase of intake air mass.

In one approach, the above disadvantages may be overcome by a system for a vehicle traveling on the road. The system comprises: an engine having at least a cylinder with an intake valve configured to cover and uncover an intake opening into the cylinder, the cylinder coupled to an intake manifold; a compression device coupled to said engine; and an air delivery nozzle configured to deliver pressurized air to said cylinder via said opening, where said nozzle has a converging-diverging shape so that discharged air is at a supersonic velocity at least under some operating conditions. Further, in some embodiments, the discharged air may be mixed with a subsonic air stream, where the subsonic air stream is from the intake manifold In this way, it is possible to take advantage of the compression device to enable reduced air storage, while utilizing a nozzle to more effectively utilize the compressed air that is available. For example, when the supersonic air stream is mixed with a subsonic stream from the intake manifold, the total momentum of the two streams is combined and conserved, so that the velocity of the mixed stream, and consequently the stagnation pressure, is increased. Thus, it is possible to use energy of the pressured air stream to increase the flow from the lower pressure intake manifold. In this way, less pressured air may be used to achieve desired compensation, thus improving efficiency in the use of the compressed air and in the storage space needed.

DETAILED DESCRIPTION

As noted above, the present application describes an approach that provides boost compensation to reduce effects of compressor delays, such as the phenomena known as turbo-lag, as well as improve various other engine operations, such as engine cold starting. In one particular example, a separate source of compressed air is available to be rapidly supplied to the engine (e.g., via the intake manifold, intake port, or cylinder head) during selected conditions, such as in response to a driver tip-in, thus reducing turbo-lag. The additional air from the air amplifier serves to provide a rapid increase in cylinder charge, even when manifold pressure has yet to be increased by a turbocharger. Furthermore, the injection of higher pressure air into the engine cylinders results in an almost immediate increase in exhaust flow, which enhances function of the turbocharger, and thus can further reduce the turbo-lag period. In other words, it is possible to create more flow into the cylinder than what comes from a compressed air source, but in one example, this air flow amplification is implemented only until the turbocharger comes up to speed.

In one example, the compressed air supply may be provided upstream of the engine between the engine air filter and the intake manifold, either before or after the turbocharger. Alternatively, the compressed air could be supplied in the intake manifold or cylinder head. Further, an ejector may be used to create an ejector boost system. For example, an ejector may be integrated into a valve seat to further improve operation. In still another example, the system may be applied in direct injection gasoline engines to achieve improved air-fuel ratio control, or applied to improve engine cold starting of gasoline or diesel engines.

In this way, it is possible to utilize an air source in combination with a compression device to provide improved operation for an engine using gasoline, diesel, or various other fuel types.

Figure 1:
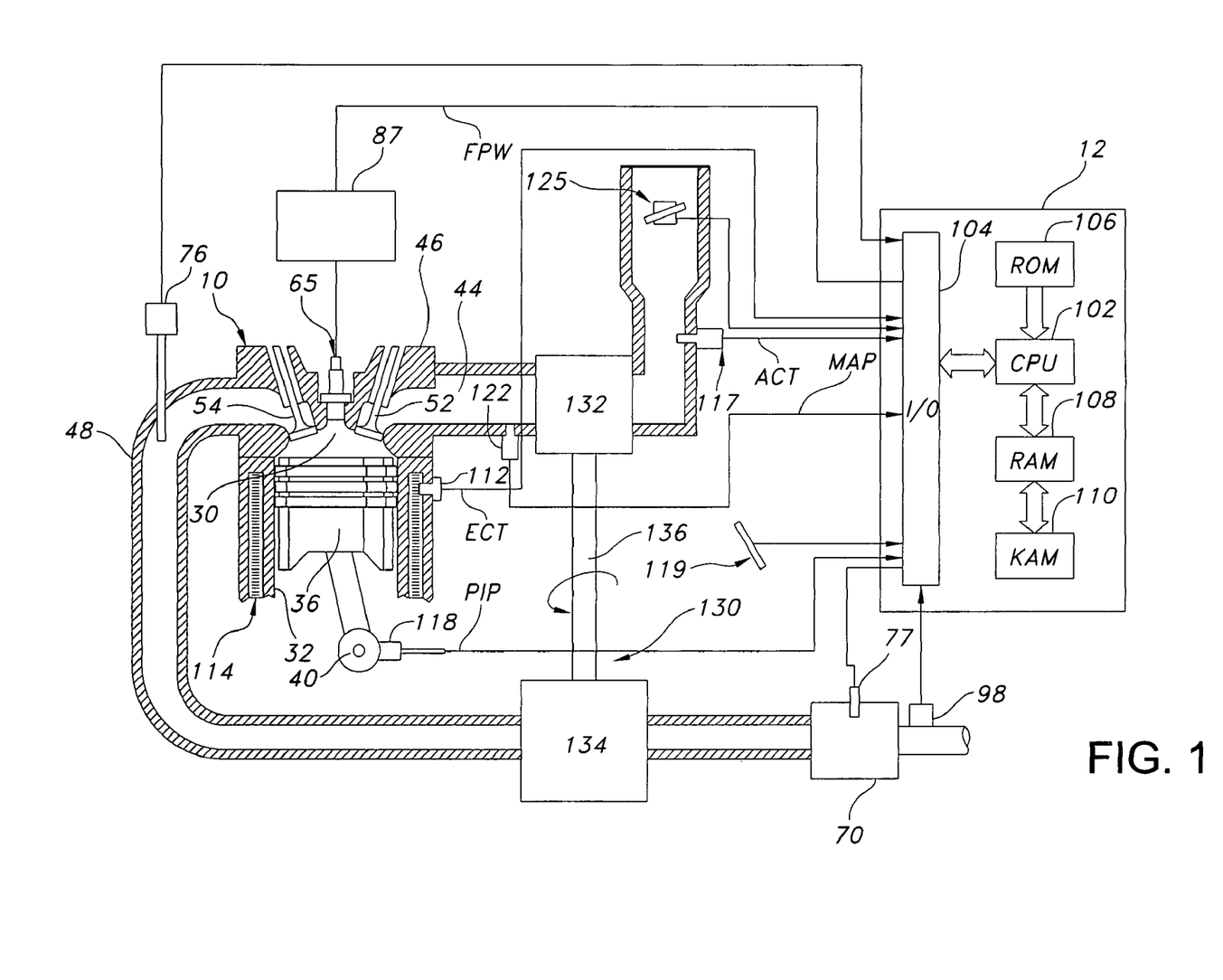
FIGS. 1-3 are each a schematic diagram of an engine.

Referring now to FIG. 1, internal combustion engine 10, comprising a plurality of cylinders, one cylinder of which is shown in FIG. 1, is controlled by electronic engine controller 12. Engine 10 includes cylinder head 46, combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by a camshaft, or both may be operated by a common camshaft. Variable valve timing operation may be used via a hydraulic actuator. In an alternative embodiment, the valves may be operated by an electromechanically controlled valve coil and armature assembly.

Cylinder 30 is also shown having direct fuel injector 65 coupled thereto for delivering liquid fuel in proportion to the pulse width of signal FPW from controller 12 via a fuel injection system 87, which may be a high pressure common rail diesel fuel system. Fuel system 87 may include a fuel tank, high and low pressure fuel pumps, and a fuel rail (not shown). The engine 10 of FIG. 1 is configured such that the fuel is injected directly into the engine cylinder, which is known to those skilled in the art as direct injection. In addition, intake manifold 44 is shown communicating with optional electronic throttle 125.

Engine 10 is also shown coupled to a turbocharger system 130, which is one example compression device that may be used. Turbocharger system 130 includes a compressor 132 on the intake side and a turbine 134 on the exhaust side coupled via a shaft 136. In an alternative embodiment, a two-stage turbocharger may be used, if desired. In another alternative embodiment, a supercharger may be used having a compressor similar to 132 that is driven via the engine crankshaft 40.

Universal Exhaust Gas Oxygen (UEGO) sensor 76 is shown coupled to exhaust manifold 48 upstream of turbine 134 and emission control device 70. Device 70 may be a NOx catalyst, an SCR (selective catalytic reduction) catalyst, a particulate filter, or combinations thereof. A second exhaust gas oxygen sensor 98 is shown coupled to the exhaust system downstream of catalytic converter 70. Emission control device temperature is measured by temperature sensor 77, and/or estimated based on operating conditions such as engine speed, load, air temperature, engine temperature, and/or airflow, or combinations thereof.

Controller 12 is shown in FIG. 1 as a conventional microcomputer including: microprocessor unit 102, input/output ports 104, and read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to an accelerator pedal; a measurement of engine manifold pressure (MAP) from pressure sensor 122 coupled to intake manifold 44; a measurement (ACT) of engine air charge temperature or manifold temperature from temperature sensor 117; and an engine position sensor from a Hall effect sensor 118 sensing crankshaft 40 position. In a preferred aspect of the present description, engine position sensor 118 produces a predetermined number of pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variations or combinations thereof.

Engine 10 further has a pressurized air delivery system for delivering higher pressure air to the combustion chamber, an example of which is described in more detail below herein with regard to FIG. 4.

Figure 2:
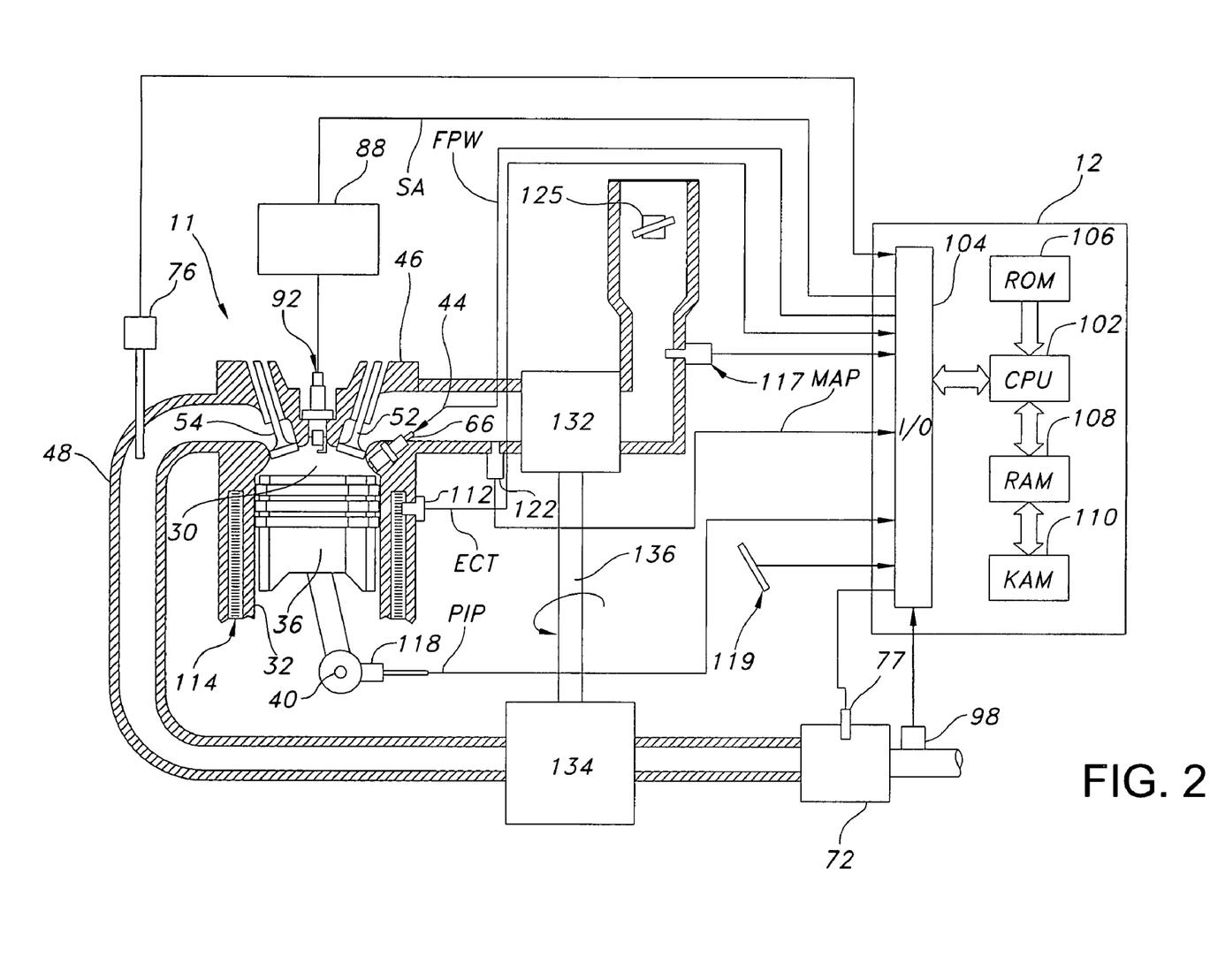

FIG. 2 shows an alternative embodiment of a gasoline direct injection engine 11 similar to that of FIG. 1. In the example of FIG. 2, cylinder head 46 is shown having fuel injector 66 coupled thereto for delivering liquid fuel in proportion to the pulse width of signal FPW from controller 12. Fuel is delivered to fuel injector 66 by a fuel system (not shown) including a fuel tank, fuel pump, and fuel rail (not shown). In one example, a low pressure direct injection system may be used, where fuel pressure can be raised to approximately 20-30 bar. Alternatively, a high pressure, dual stage, fuel system may be used to generate higher fuel pressures. FIG. 2 also shows distributorless ignition system 88 providing ignition spark to combustion chamber 30 via spark plug 92 in response to controller 12.

Continuing with FIG. 2, it shows catalytic converter 72, which can include multiple catalyst bricks, in one example. In another example, multiple emission control devices, each with multiple bricks, can be used. Converter 72 can be a three-way type catalyst in one example.

Engine 11 also has a pressurized air delivery system for delivering higher pressure air to the combustion chamber, an example of which is described in more detail below herein with regard to FIG. 4.

Figure 3:
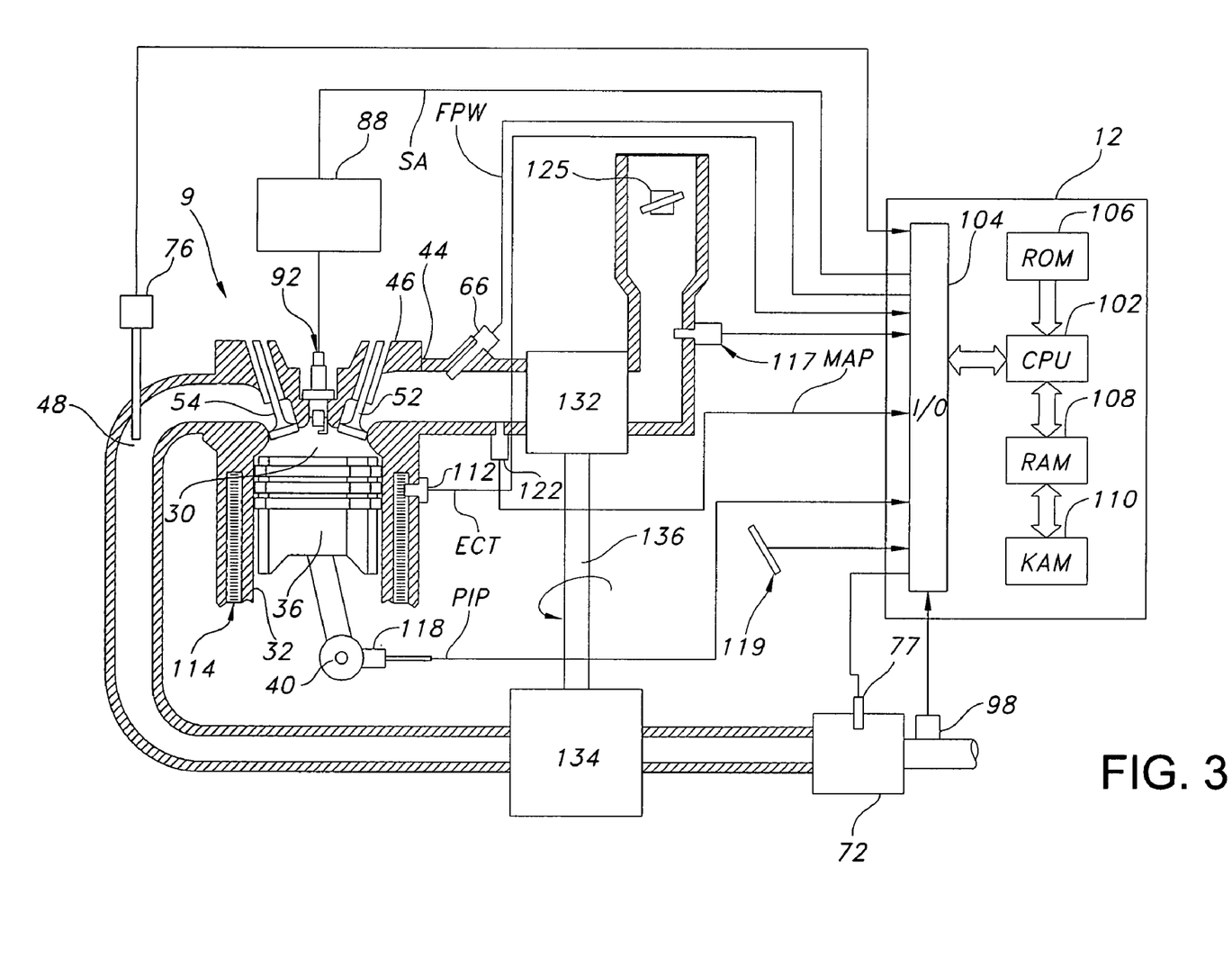

In still another alternative example, engine 9 may be a port injected gasoline engine. Specifically, FIG. 3 shows still another alternative embodiment of a gasoline port injection engine 9 similar to that of FIGS. 1 and 2. In the example of FIG. 3, an intake port of manifold 44 is shown having fuel injector 66 coupled thereto for delivering liquid fuel in proportion to the pulse width of signal FPW from controller 12.

Any of engines 9, 10, 11 may be used for road vehicles, boats, earthmoving equipment, airplanes, generators, pumps, etc.

Figure 4:
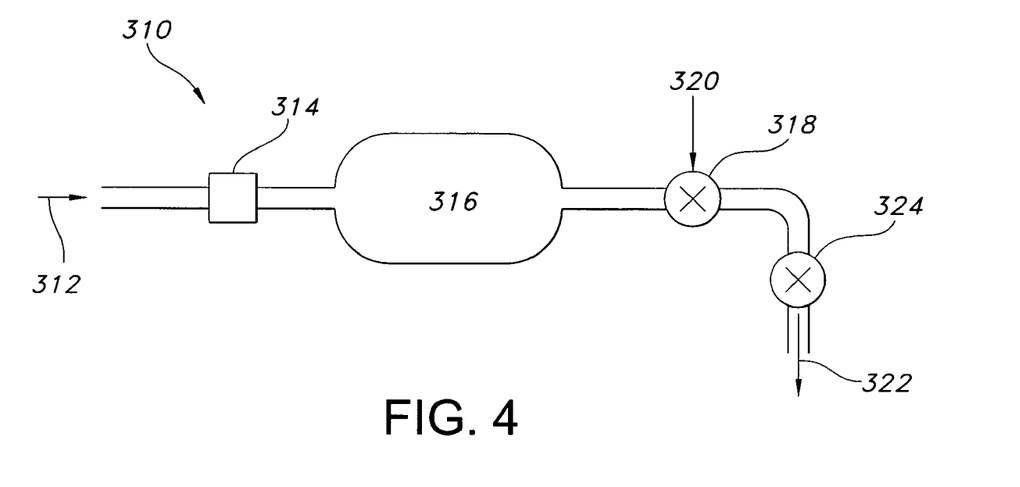
FIG. 4 shows a schematic diagram of an example air storage system that may be used with various types of engines, such as those in FIGS. 1-3.

Referring now to FIG. 4, an example air storage system 310 is described that may be coupled to engine 9, 10, or 11. Specifically, compressed air 312 is directed to the system from a high pressure compression device (such as a compressor (not shown)), through one-way check valve 314 to storage tank 316. The valve 314 enables flow into tank 316, but restricts flow from tank 316 to the compression device. Further, in one example, system 310 also includes control valve 318, receiving a control signal 320 from controller 12, for controlling air via pressure regulator valve 324 to the air amplifier as described in more detail with regard to the example embodiments of FIGS. 4-6. In this way, it is possible to supply higher pressure air to the engine even when turbocharger pressure buildup is delayed due to turbo-lag, for example. Further, by using such a system, it is possible to store compressed air gradually with a smaller compressor, yet provide a large flow rate for shorter intervals of time, as needed to prevent turbo-lag.

The storage pressure in tank 316 may vary depending on the mass of air stored in the tank, but can vary as high as the compressor output pressure, which may be 1500 psi or higher. However, as the duty cycle usage of compressed air in the engine may be relatively low compared to all engine operation (e.g., during turbo-lag conditions, or engine starting conditions, for example), a low volume, high pressure, compressor can be used to charge the tank slowly compared to the rate of flow exiting during use.

The pressure regulator 324 is generally set to maintain a pressure of about 150 psi, so that air fed to the primary nozzle inlet is generally maintained at about this pressure, which may be significantly higher than manifold pressure. As will be described in more detail below herein, the primary nozzle then uses this compressed air at about 150 psi, along with air in the intake manifold (whose pressure may vary depending on the state of the turbocharger, engine speed, throttle position, etc.) to create increased flow into the engine cylinder.

As noted herein the air amplifier may be referred to as an ejector assembly, air ejector, air amplifier, and flow amplifier.

Figure 5:
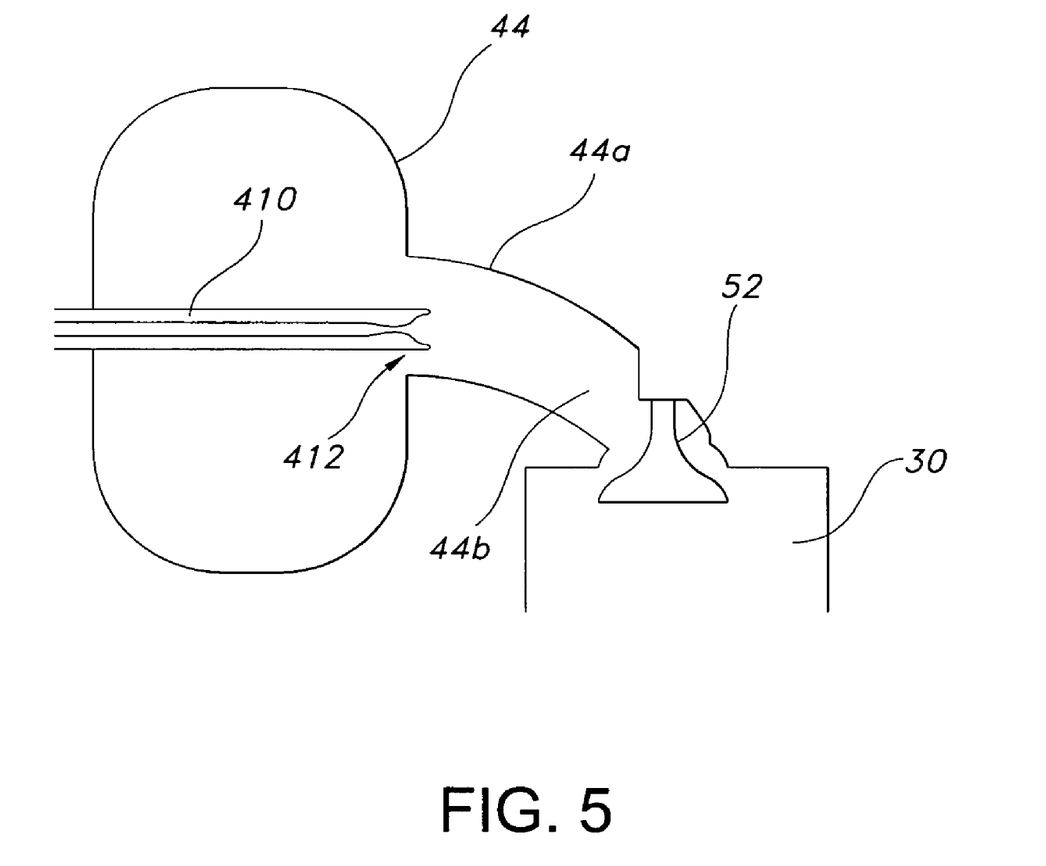
FIGS. 5-7 show example embodiments of ejector systems that may be used with the storage system of FIG. 4.

Referring now to FIG. 5, a first example embodiment for delivering higher pressure air to engine 9, 10, or 11 is described. In this example, intake manifold 44 is shown with an intake runner 44a having throat area 44b leading to intake valve 52 and cylinder 30, with a high pressure tube 410 delivering pressurized air. Specifically, the pressurized air tube 410 is coupled in the intake manifold and includes a supersonic nozzle 412 directed into each intake runner (only one of which is shown). In this way, the manifold plenum serves as an ambient air inlet, the pressurized air tube 410 serves as a primary nozzle, the manifold runner serves as a secondary nozzle, the throat of the port (44b) serves as a mixing tube, and finally the cylinder serves as a diffuser. Such a system may be generated for each cylinder of the engine by placing a nozzle in each intake runner. In this way, it is not necessary to pressurize the entire plenum volume, resulting in faster delivery of boost pressure to the cylinders, and less heat loss to the manifold walls for further improvement of engine cold start.

In example operation, each individual nozzle may be fitted with a valve to synchronize the nozzle flow with intake valve open position, in addition to control of pressurized air via valve 318. In an alternative embodiment, the plurality of nozzles may be controlled via a single valve.

Figure 6:
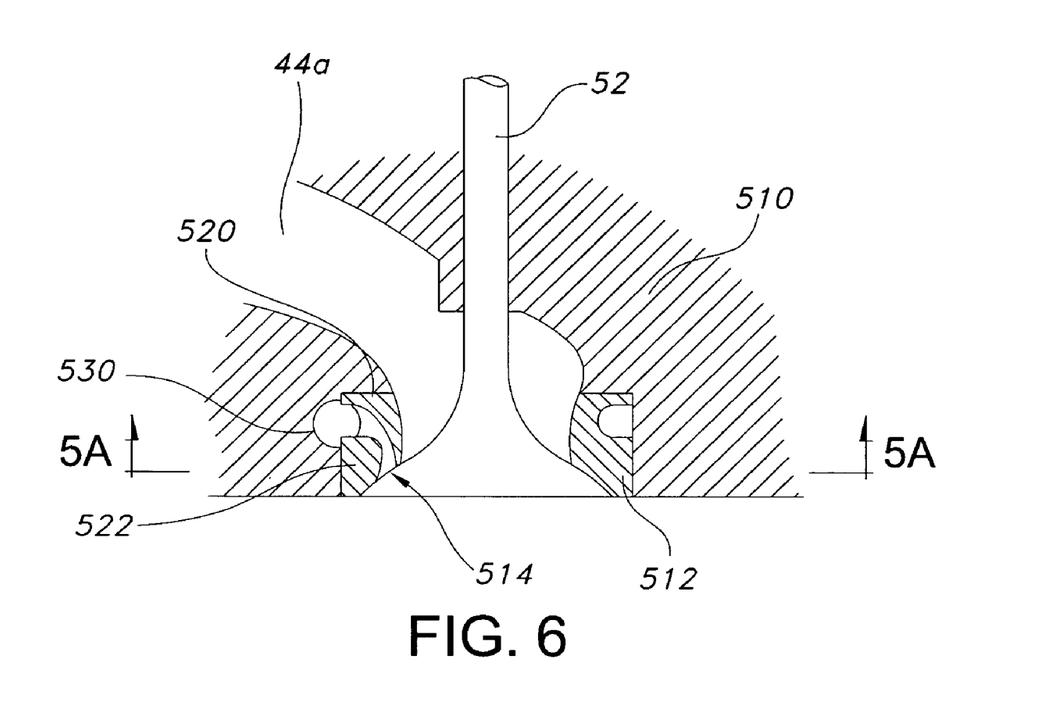

Referring now to FIG. 6, a second example embodiment for delivering higher pressure air to engine 9, 10, or 11 is described. Specifically, FIG. 6 shows a sectional view of a second example embodiment for delivering higher pressure air to engine 9, 10, or 11. In this example, intake manifold runner 44a is shown leading to intake valve 52. Valve 52 seats against a unitary valve insert/seat 512 located in cylinder head 510. Insert 512 includes a port portion 520 and a head portion 522. Insert 512 includes an annular supersonic nozzle 514 formed in insert 512. The nozzle may have a converging-diverging shape as shown in FIG. 6. Pressurized air may be delivered via one or more delivery tubes 530 to the annular nozzle 514.

In this way, it is possible to incorporate a supersonic nozzle into the cylinder head, with at least one nozzle at each cylinder. When the intake valve is closed, as shown in FIG. 6, the pressurized air outlet is blocked by the intake valve head. When the intake valve is open, the diverging nozzle formed within the insert directs a supersonic discharge past the valve head and into the cylinder, thus forming an ejector with an annular supersonic nozzle. Thus, the amount of compressed air consumed during delivery may be reduced since air is delivered only during operation where the intake valve is open. Further, if a controller is used to estimate an amount of air delivered via the nozzle, the amount can be estimated based on intake valve opening and closing timings, as well as cylinder pressure and upstream (e.g., compressed air supply) pressure. For example, with variable valve timing of either the intake and/or exhaust valves, variation in valve timing may affect the amount of compressed air delivered, such as in the systems of FIGS. 6-7, for example. Therefore, the controller may include routines for estimating an amount of compressed air that accounts for variation in valve opening and/or closing timings.

Figure 6A:
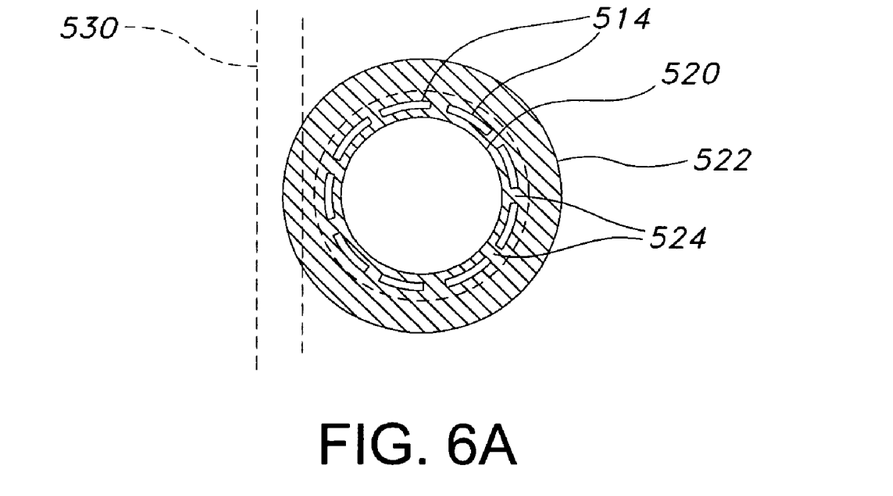

Returning to the structure of FIG. 6, by using a unitary insert, it is possible to provide a supersonic nozzle with reduced part count, and provide improved ability to control dimensions allowing improved tolerancing. Further, structural bridges 524 (see FIG. 6A) may be included within the annular nozzle to attach the port and head portions to each other and to carry the forces of installation into the head and impact from the closing of the intake valve. The bridges may cause interruptions in the annularity of the nozzle, but should not cause major degradation of function. For example, the bridge may be designed with a length (in the direction of flow) longer than a width, thereby providing desired structural rigidity while reducing impact on flow.

Figure 7:
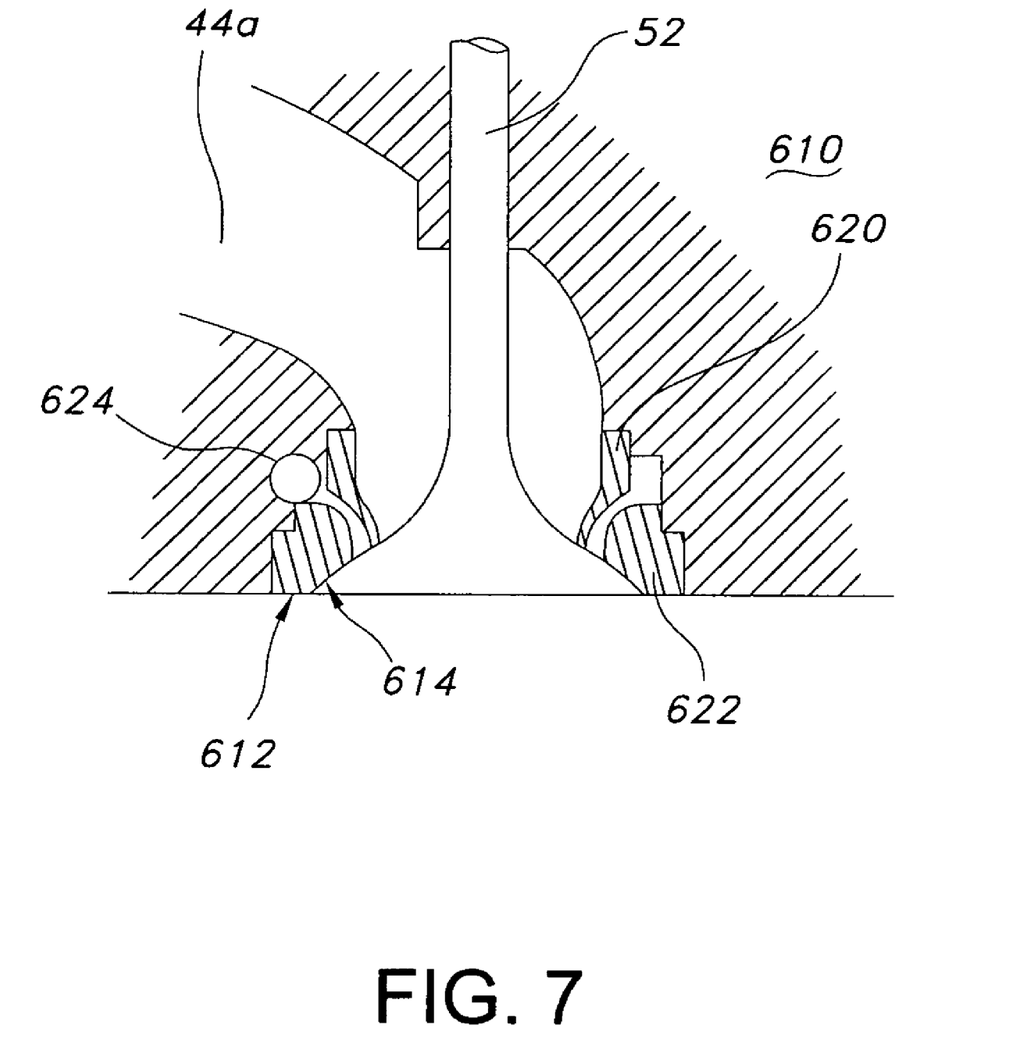

Referring now to FIG. 7, a sectional view of a third example embodiment for delivering higher pressure air to engine 9, 10, or 11 is described. In this example, intake manifold runner 44a is shown leading to intake valve 52. Valve 52 seats against a 2-piece valve insert/seat 612 located in cylinder head 610. Insert 612 includes a port piece (insert) 620 and a head piece (seat) 622. Insert 612 thus forms an annular supersonic nozzle 614 formed in insert 612. Pressurized air may be delivered via one or more delivery tubes 624 to the annular nozzle 614.

In this way, it is possible to incorporate a supersonic nozzle into the cylinder head, with at least one nozzle at each cylinder. When the intake valve is closed, as shown in FIG. 7, the pressurized air outlet is blocked by the intake valve head. When the intake valve is open, the diverging nozzle formed between the two inserts directs a supersonic discharge past the valve head and into the cylinder, thus forming an ejector with an annular supersonic nozzle. Thus, the amount of compressed air consumed during delivery may be reduced since air is delivered only during operating where the intake valve is open. Further, if a controller is used to estimate an amount of air delivered via the nozzle, the amount can be estimated based on intake valve opening and closing timings, as well as cylinder pressure and upstream (e.g., compressed air supply) pressure.

Figure 8:
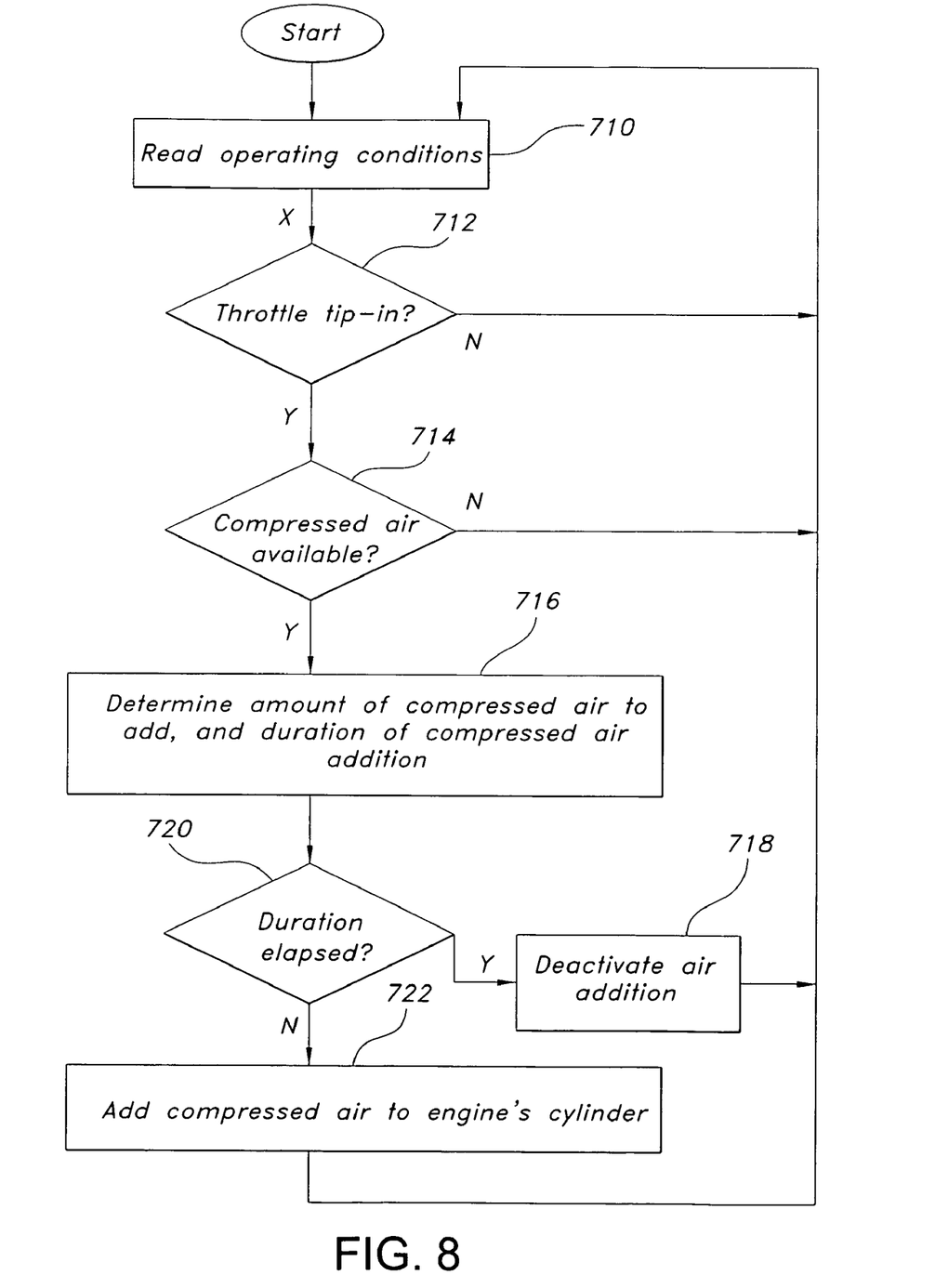
FIGS. 8-10 show high level flowcharts of example engine operation.

Referring now to FIG. 8, a first example embodiment of a routine for controlling engine operation to reduce turbo-lag is described. In this example, which may be a diesel or gasoline engine, the routine first determines engine operating conditions in 710, such as engine speed, engine load, throttle position, intake manifold absolute pressure, engine temperature, storage pressure of tank 316, temperature of tank 316, turbine/compressor speed, and others.

Then, in 712, the routine determines whether an accelerator pedal tip-in has occurred under conditions in which turbo-lag may exist. For example, this may occur during lower turbine speed conditions, or low mass airflow conditions. If so, the routine continues to 714 to determine whether compressed air is available, for example, in response to pressure in tank 316. Further, a need for additional compressed air may also be based on other indications, such as a desired engine torque, a rate of change of desired torque, a driver demanded torque, etc. In addition, or in the alternative, an indication may also be generated that additional compressed air is desired during engine cold starting. For example, a boost of cylinder inlet pressure may result in higher compression temperatures in the combustion chamber and serve to improve engine cold starting combustion, especially for a diesel engine. A separate boost control strategy may be used to optimize diesel engine cold starting, for example, such as determining an amount of increased airflow to generate based on air temperature, barometric pressure, coolant temperature, etc.

If pressurized air is available, the routine continues to 716 to determine an amount of compressed air to add and/or a duration of compressed air addition. For example, under some conditions, it may be advantageous to provide compressed air for a first number of combustion events, or until a selected turbine speed is reached, while under other conditions, it may be advantageous to provide compressed air for a longer duration or a greater number of combustion events, or to a higher turbine speed. Further, the routine activates valve 320 to make compressed air available to the ejector system.

Next, in 720, the routine determines if the duration (or other measure) of 716 has elapsed, thus indicating the additional supply of air is no longer requested. If so, the routine continues to 718 to deactivate compressed air addition, e.g., by deactivating valve 320. Otherwise, the routine continues to 722 to add compressed air to the engine's cylinders. For example, the routine may control additional valves (if present) to control the timing of addition of compressed air, or may rely on a valve insert ejector system, as described herein.

In this way, it is possible to supply additional air when needed to compensate for turbo-lag. Further, the ejector may be used only for the duration of turbo-lag period, thus reducing the size of compressed air storage needed.

It should be noted that during the period of air injection at 722, before the desired duration of injection that was calculated at 716 has been determined at 720 to have elapsed, the operating conditions and accelerator pedal tip-in status are continually being monitored at 710 and 712. If there is a change of conditions, such as a driver "change of mind" with the throttle being rapidly closed, a new calculation of desired duration will be sent to 720 to possibly override a prior decision.

Figure 9:
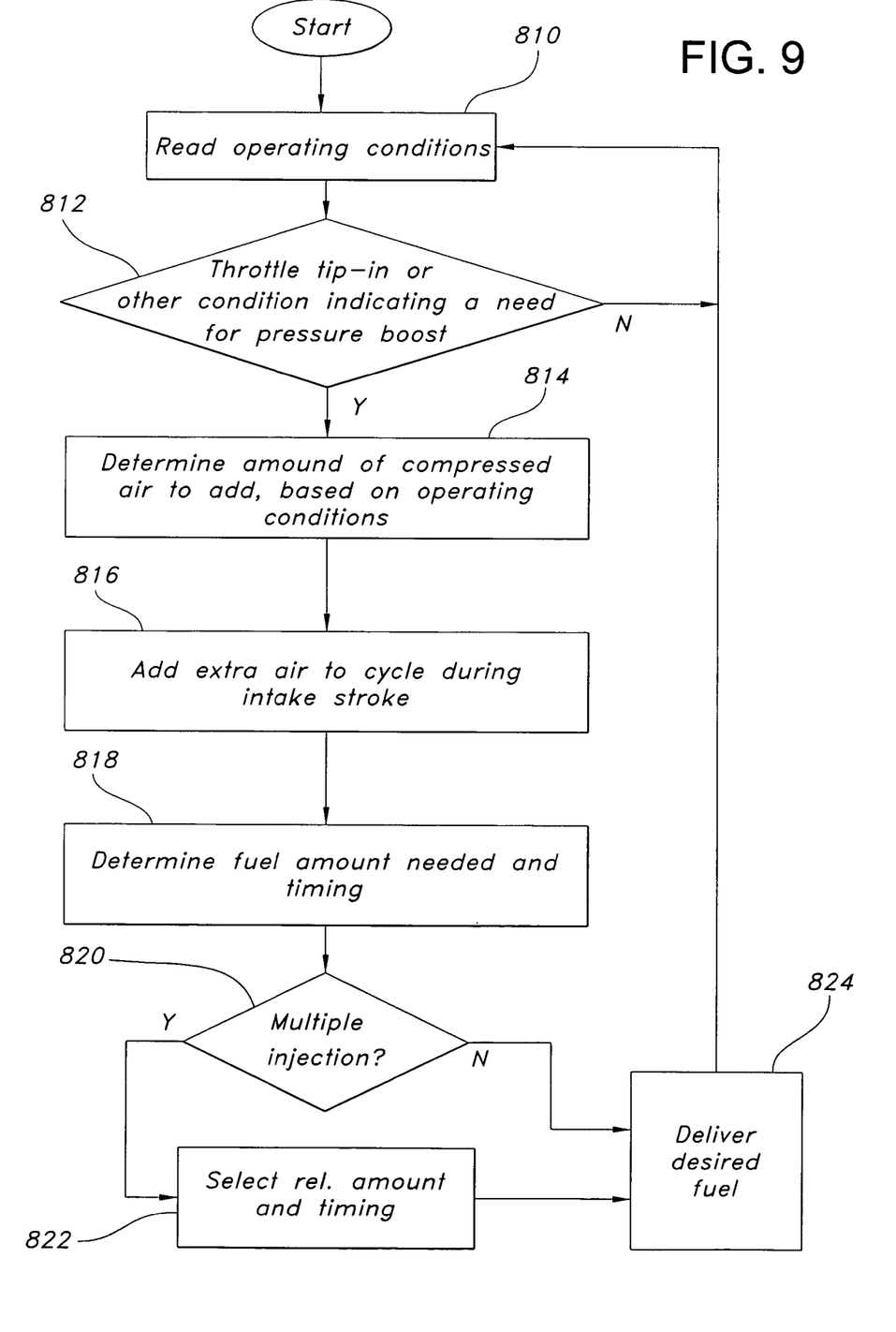

Referring now to FIG. 9, a second example embodiment of a routine for controlling engine operation to reduce turbo-lag is described. In this example, which may be a diesel or gasoline engine, the routine first determines engine operating conditions in 810, such as engine speed, engine load, throttle position, intake manifold absolute pressure, engine temperature, storage pressure of tank 316, temperature of tank 316, turbine/compressor speed, and others. Then, in 812, the routine determines whether a tip-in or other condition indicative of a possible turbo-lag, or desire for compressed air, is present. For example, compressed air may aid cold start performance, especially for a diesel engine. Also, as noted with regard to 812, other parameters and factors may also be used. If the answer to 812 is yes, the routine continues to 814 to determine an amount and/or duration of compressed air to add in response to operating conditions, such as those determined in 810. Then, in 816 the routine adds the extra air to the cylinders as noted above with regard to FIG. 8.

Then, the routine determines a fuel amount adjustment based on the addition of pressurized air. Further, the routine may also determine an injection timing adjustment as different fuel injection timing may be used when adding pressurized air from the injection timing without pressurized air. In the example of a gasoline engine where air-fuel ratio is controlled to a desired value, such as about stoichiometry, the routine may determine a fuel adjustment amount to match the additional air due to the pressurized air addition and thereby maintain a desired air-fuel ratio.

Next, in 820, the routine determines whether multiple injection may be used, which may be based on whether pressurized air is added, and other operating conditions. The use of multiple injections may be used to provide faster fuel injection later in the induction stroke, rather than waiting for later fueled cylinder events to match added air. If the answer to 820 is yes, the routine continues to 822 to select the relative amount of fuel and timing between the multiple injection events. Then, in 824, the routine delivers the desired fuel injection (or injections) at the selected timing (or timings).

In this way, it is possible to coordinate fuel injection amounts and/or timing with the addition of pressurized air to reduce the effects of turbo-lag, while maintaining desired air-fuel ratio.

Note that the routine may determine the amount of pressured air added based on various factors, such as manifold pressure, pressure in tank 316, intake valve timing, and others. In addition, or in the alternative, the routine may use pressure sensors or a mass airflow sensor to measure the amount of air from the ejector system.

Figure 10:
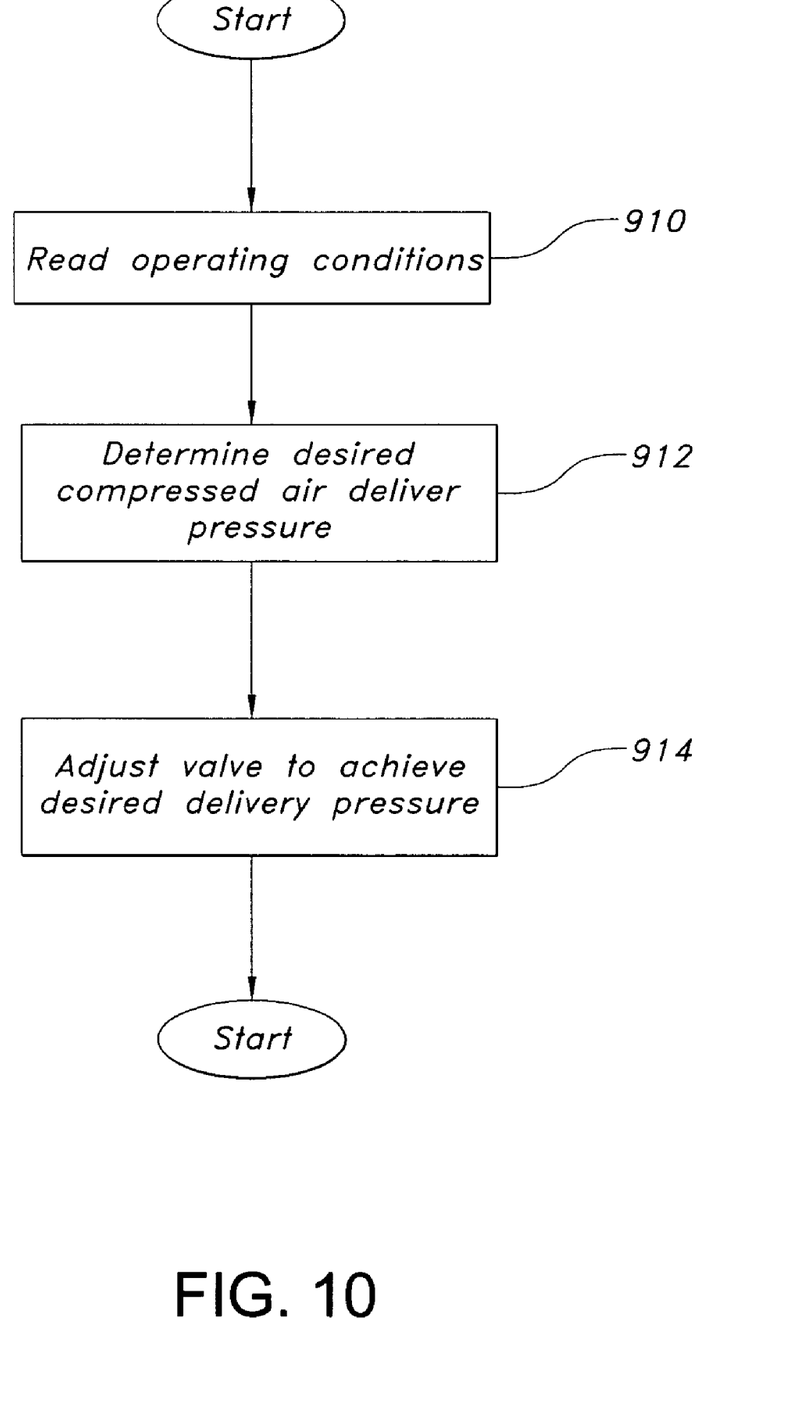

Referring now to FIG. 10, a routine is described for controlling pressure of compressed air delivered to the ejector assemblies. The routine first reads operating conditions in 910, such as temperature, manifold pressure, etc., and then determines a desired delivery pressure in 912 based on the operating conditions of 910. Then, the routine adjusts a parameter, such as an adjustable pressure regulator valve, to achieve the desired delivery pressure. In this way, higher pressure may be supplied under conditions where higher ejector flow is desired, or where valve opening time is shortened.

Note that there may be conditions where it could be possible to add additional air via the ejector assembly, but not possible to provide matching additional fuel. Under such conditions, delivery of the additional air may be delayed until matching fuel can also be provided, such as under stoichiometry control in gasoline engines.

Figure 11:
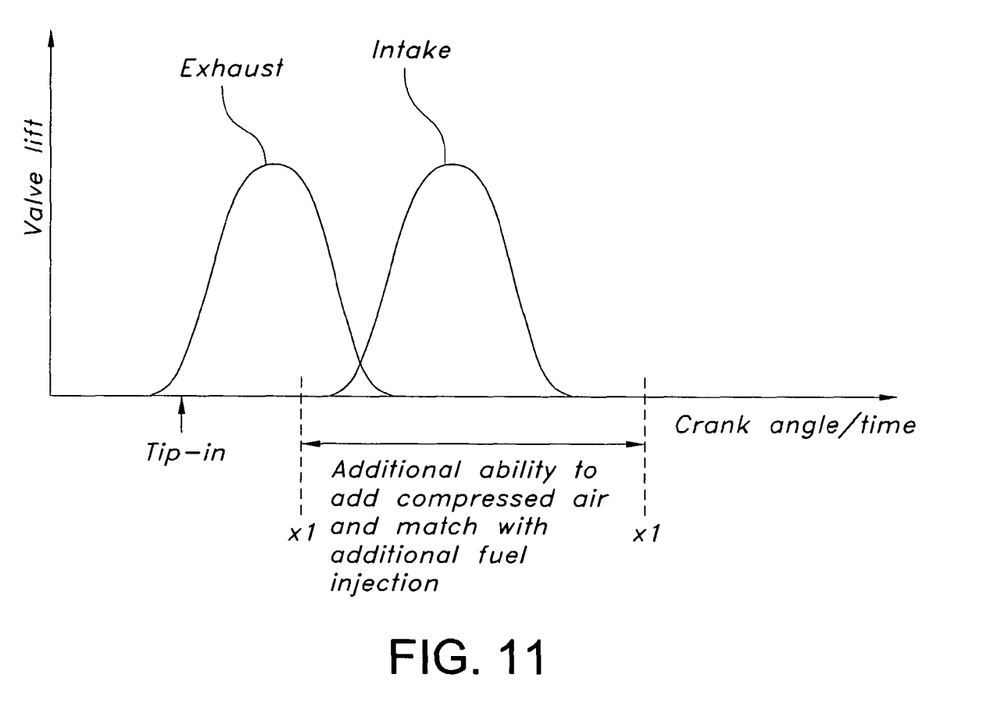
FIG. 11 shows a graph illustrating available time for fuel injection.

Referring now to FIG. 11, a graph illustrates the advantageous operation of using direct fuel injection with an ejector compensation system such as described above herein. Specifically, the graph illustrates the additional interval (from x1 to x2) available to provide extra fuel injection to compensate for the additional air from the ejector with a direct injection system as compared with a port injection system with closed valve injection.

For example, assuming a tip-in occurs at the point located, if using port fuel injection, it may not be desirable to add the compressed air for the upcoming cylinder whose valve timing is shown (since the injection of additional fuel also takes a certain amount of time). However, if direct fuel injection is used, and the fuel injection duration is lengthened (or a second injection is used), for example, it may still be possible to compensate the fuel injection for the additional air, and thus the additional air and fuel may be provided for the cylinder shown. Such operation may enable a faster response to the driver tip-in, while still maintaining a desired combustion air-fuel ratio. In this way, even if an unexpected driver tip-in occurs, it is still possible to adjust the fuel and air of a cylinder soon to be fired.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various camshaft and/or valve timings, fuel injection timings, and other features, functions, and/or properties disclosed herein.

Furthermore, the concepts disclosed herein may be applied to dual fuel engines capable of burning various types of gaseous fuels and liquid fuels.

As still another example, the particular location of sensor measurements may be varied and/or modified. For example, ACT may be measured before a turbocharger compressor and MAP measure after the compressor. Such measurement locations may be particularly advantageous in that the MAP that can be more influential to some operation of the cylinder(s) is the downstream pressure, and the ACT sensor may have a time lag that would make it inaccurate during transients where the boost pressure and resulting temperature is rapidly changing. Thus, placing the ACT sensor before the compressor may remain more stable.

In another embodiment, a spark advance strategy on a gasoline engine may be adjusted to account for pressurized air delivery. For example, during ejector function, the controller may adjust spark advance in an at least partially open loop manner to accommodate rapid transient conditions since sensor time lags may be significant. In this way, engine knock that may other occur can be reduced or avoided during delivery thereby achieving improved performance.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the injection and temperature methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine having at least a cylinder, the cylinder in communication with an intake manifold;
a compression device coupled to said engine and delivering pressurized air to said cylinder;
an air delivery nozzle selectively delivering said pressurized air to said cylinder via an intake runner; and
a controller adding said pressurized air to said cylinder via said air delivery nozzle and injecting fuel twice during a cylinder cycle in response to an operator tip-in;
wherein said pressurized air from said air delivery nozzle is mixed with a subsonic air stream, where said subsonic air stream is from said intake manifold, and where the controller adjusts a spark timing of said engine during said delivery of said pressurized air in response to the operator tip-in.

2. The system of claim 1 further comprising a plurality of nozzles, with at least one nozzle for each cylinder of the engine, wherein each of said plurality of nozzles is an ejector located in said intake manifold.

3. A system, comprising:
an engine having at least a cylinder with an intake valve configured to cover and uncover an intake opening into the cylinder, the cylinder in communication with an intake manifold;
a compression device coupled to said engine; and
an air delivery nozzle in communication with said compression device, said compression device delivering pressurized air to said cylinder via said intake opening where said nozzle has a converging-diverging shape so that discharged air is at a supersonic velocity at least under some operating conditions, wherein said nozzle is located in a valve seat, and where said nozzle is an annular nozzle.

4. The system of claim 1 wherein said air delivery nozzle is located in a one-piece valve seat insert located in a cylinder head.

5. The system of claim 1 wherein said air delivery nozzle is located in a two-piece valve seat insert located in a cylinder head.

6. The system of claim 1 wherein said air delivery nozzle delivers air during engine starting.

7. The system of claim 3 wherein said air delivery nozzle delivers air during engine cold starting.

8. The system of claim 3 wherein said compression device includes a turbocharger, and the system further comprises a controller configured to deliver said pressurized air in response to an accelerator pedal tip-in by an operator.

9. The system of claim 1 wherein said compression device includes a supercharger.

10. A system, comprising:
an engine having at least a cylinder with an intake valve configured to cover and uncover an intake opening into the cylinder, the cylinder coupled to an intake manifold;
a turbocharger coupled to said engine;
a storage reservoir for storing air pressurized by a compressor;
an air delivery nozzle configured to deliver said pressurized air to said cylinder via said intake opening, where said nozzle has a converging-diverging shape and is located in a valve seat;
a valve to deliver said pressurized air at different pressure levels; and
a direct fuel injector coupled to said cylinder.

11. The system of claim 10 wherein said pressurized air is discharged at a supersonic velocity at least under some operating conditions, and is mixed with a subsonic air stream, where said subsonic air stream is from said intake manifold.

12. The system of claim 11 wherein said nozzle is located in a valve seat insert.

13. The system of claim 12 wherein said nozzle is located in a one-piece valve seat insert.

14. The system of claim 12 wherein said nozzle is located in a two-piece valve seat insert.

15. The system of claim 12 further comprising a controller configured to deliver said pressurized air in response to a tip-in by an operator, and to adjust fuel injected from said injector to compensate for additional air in the cylinder caused by said delivery of pressurized air.

16. The system of claim 10 further comprising a spark plug in said cylinder.

17. A method for an engine having a turbocharger and an air ejector assembly, comprising:
delivering supersonic pressurized air to an engine cylinder via a converging-diverging nozzle within the air ejector assembly, in response to a driver tip-in;
setting a duration of said delivery of supersonic pressurized air to correspond to an anticipated duration of turbocharger turbo-lag; and
performing multiple fuel injections to the cylinder during a cylinder cycle in response to the driver tip-in.

18. The method of claim 17 further comprising estimating an amount of air entering said engine cylinder based on a storage pressure and cylinder pressure.

19. The method of claim 17 further comprising ending said delivery of pressurized air in response to at least one of depletion of pressurized air storage and spinning up of the turbocharger.

20. The method of claim 17 further comprising adjusting spark timing of the engine during at least a portion of said duration to reduce a tendency of engine knock.

21. The method of claim 17 further comprising increasing airflow from an intake manifold to said engine cylinder via the delivery of supersonic pressurized air.

22. The system of claim 1, wherein said air delivery nozzle is in communication with said compression device, said compression device delivering pressurized air to said engine cylinder via an intake opening, where said nozzle has a converging-diverging shape so that discharged air is at a supersonic velocity at least under some operating conditions.

* * * * *